US007130705B2

(12) United States Patent
Amir et al.

(10) Patent No.: US 7,130,705 B2
(45) Date of Patent: Oct. 31, 2006

(54) SYSTEM AND METHOD FOR MICROPHONE GAIN ADJUST BASED ON SPEAKER ORIENTATION

(75) Inventors: Arnon Amir, Cupertino, CA (US); Gal Ashour, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 09/757,012

(22) Filed: Jan. 8, 2001

(65) Prior Publication Data

US 2002/0090094 A1 Jul. 11, 2002

(51) Int. Cl.
*G06F 17/00* (2006.01)

(52) U.S. Cl. .......................... 700/94; 381/107; 381/92

(58) Field of Classification Search .................. 381/92, 381/122, 91, 111, 113, 104–109, 309–310; 700/94; 348/206.16, 231.4; 396/99, 105; 379/202.01, 388.03
See application file for complete search history.

(56) References Cited

U.S. PATENT DOCUMENTS

| | | | | |
|---|---|---|---|---|
| 3,723,670 | A | 3/1973 | Sebesta et al. | |
| 4,167,752 | A * | 9/1979 | Liebler et al. | 381/56 |
| 4,449,189 | A | 5/1984 | Feix et al. | |
| 4,499,578 | A | 2/1985 | Marouf et al. | |
| 4,531,229 | A * | 7/1985 | Coulter | 381/23.1 |
| 4,543,537 | A | 9/1985 | Kuhn et al. | |
| 4,716,585 | A | 12/1987 | Tompkins et al. | |
| 4,747,065 | A * | 5/1988 | West | 708/200 |
| 4,791,477 | A | 12/1988 | Blazek et al. | |
| 4,807,051 | A * | 2/1989 | Ogura | 386/107 |
| 4,908,855 | A * | 3/1990 | Ohga et al. | 379/392.01 |
| 5,027,410 | A * | 6/1991 | Williamson et al. | 381/320 |
| 5,164,840 | A * | 11/1992 | Kawamura et al. | 386/107 |
| 5,276,916 | A | 1/1994 | Pawlish et al. | |
| 5,289,544 | A | 2/1994 | Franklin | |
| 5,477,270 | A * | 12/1995 | Park | 348/222.1 |
| 5,640,490 | A | 6/1997 | Hansen et al. | |
| 5,764,779 | A | 6/1998 | Haranishi | |
| 5,884,156 | A * | 3/1999 | Gordon | 455/321 |
| 5,896,450 | A | 4/1999 | Kurihara | |
| 6,005,610 | A * | 12/1999 | Pingali | 348/169 |
| 6,151,400 | A * | 11/2000 | Seligman | 381/317 |
| 6,195,572 | B1 * | 2/2001 | Patterson et al. | 455/570 |
| 6,275,258 | B1 * | 8/2001 | Chim | 348/211.12 |
| 6,421,064 | B1 * | 7/2002 | Lemelson et al. | 345/688 |
| 6,545,601 | B1 * | 4/2003 | Monroe | 340/521 |

(Continued)

FOREIGN PATENT DOCUMENTS

JP 05-183621 * 7/1993

OTHER PUBLICATIONS

Matsuo et al., "Speaker-Position Detection System Using Audio-visual Information"Fujitsu Study Report, vol. 35, No. 2 (10 pages).*

*Primary Examiner*—Vivan Chin
*Assistant Examiner*—Corey Chau
(74) *Attorney, Agent, or Firm*—John L. Rogitz

(57) ABSTRACT

A system and method for automatically adjusting the gain of an audio system as a speaker's head moves relative to a microphone includes using a video of the speaker to determine an orientation of the speaker's head relative to the microphone and, hence, a gain adjust signal. The gain adjust signal is then applied to the audio system that is associated with the microphone to dynamically and continuously adjust the gain the audio system.

5 Claims, 2 Drawing Sheets

SYSTEM

U.S. PATENT DOCUMENTS 6,600,824 B1 * 7/2003 Matsuo ........................ 381/92
6,748,088 B1 * 6/2004 Schaaf ........................ 381/92
6,757,397 B1 * 6/2004 Buecher et al. ............. 381/122
2002/0068537 A1 * 6/2002 Shim et al. .............. 455/177.1

* cited by examiner

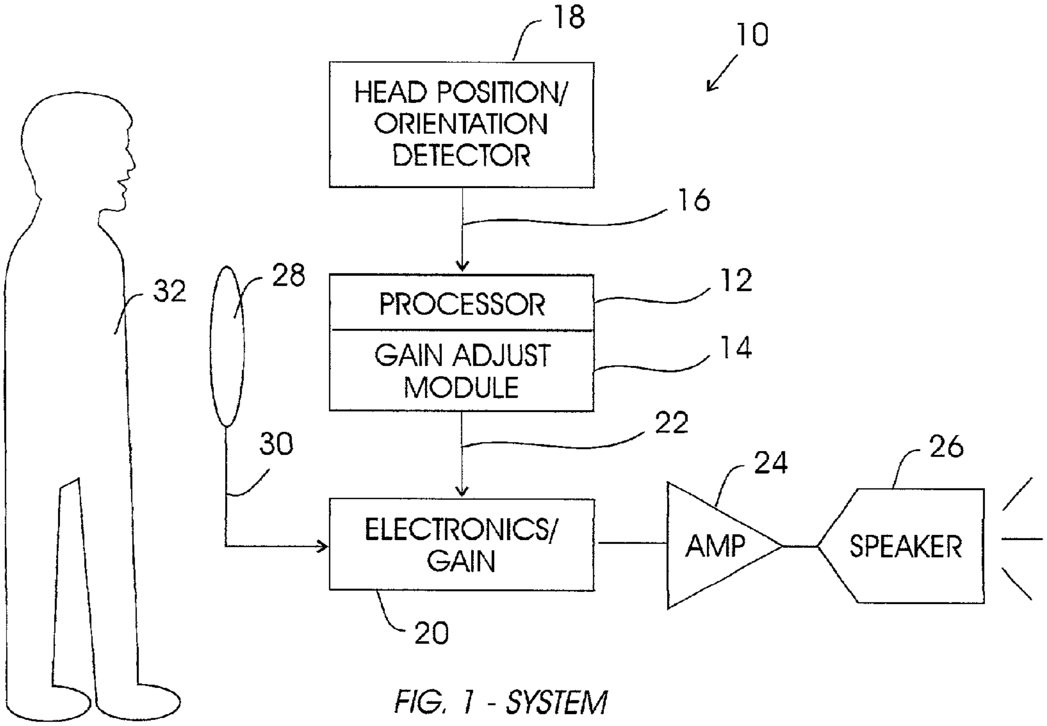
FIG. 1 - SYSTEM
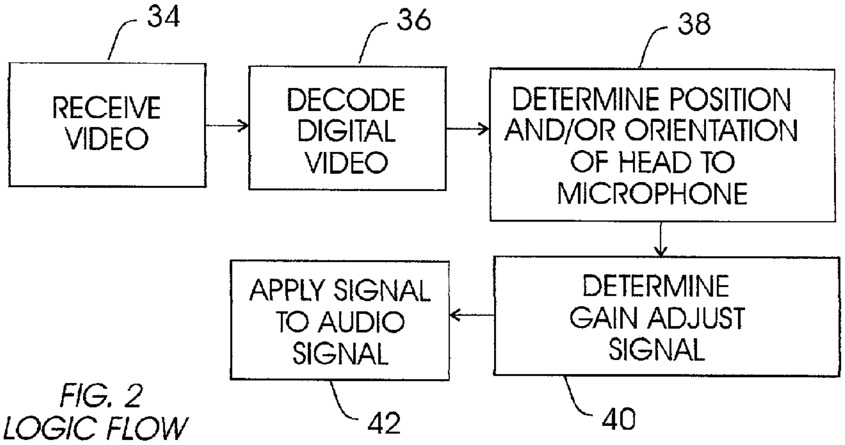
FIG. 2
LOGIC FLOW

*LOGIC FLOW FOR AUTOMATIC MAPPING*

*DUAL GAIN ADJUST BLOCK DIAGRAM*

SYSTEM AND METHOD FOR MICROPHONE GAIN ADJUST BASED ON SPEAKER ORIENTATION

BACKGROUND OF THE INVENTION

1. Field of the Invention

The present invention relates generally to adjusting the gain of one or more microphones based on the position and/or orientation of a speaker relative to the microphones.

2. Description of the Related Art

Audio systems, including stage systems, teleconferencing and video conferencing systems, lecture videotaping and distance learning systems, mobile telephones, and other media typically include one or more microphones for receiving a person's voice, an amplifier that amplifies the output of the microphone, and an audio speakers that plays the amplified sound. Ordinarily, when an audio system is calibrated, the volume output by the audio speaker is adjusted (by, e.g., adjusting the amplifier gain) to a desired volume for the case where a person speaks directly into the microphone. This can be thought of as calibrating the system for a 0° orientation of the person's head relative to the microphone, at a nominal mouth-to-microphone distance.

Should the speaker move away from the microphone or turn her head away from the 0° orientation, however, the sound level at the microphone is less than what the system was calibrated for. The audio speaker volume accordingly decreases, which can be annoying and distracting. On the other hand, if the system is calibrated for a head orientation of other than 0°, when the person subsequently speaks directly into the microphone the audio speaker volume increases, again potentially distracting the intended recipient or recipients from what the person is saying.

The common approach to resolving the above-noted problem is to physically hold the microphone in a single location in front of the person's mouth, either by clipping the microphone to the person's clothes, by suspending the microphone from a head-worn harness in front of the person's mouth, or by training the person to steadily hold the microphone in front of her mouth. All of these approaches suffer drawbacks. Even when a microphone is clipped to clothing, the person can turn her head away from the microphone to an orientation other than that for which the system was calibrated. Many people do not like to wear harnesses on their heads, and even experienced stage performers can temporarily wave a hand held microphone away from their mouths without intending to.

Accordingly, the present invention recognizes that it would be desirable to automatically adjust the gain of an audio system in synchronization with the head movements of a speaking person relative to a microphone. Past attempts at automatic gain adjust do not use actual speaker motion to adjust gain but instead are based on attempting to vary gain to establish a baseline audio output in response to varying received audible levels, which at best are indirectly related to speaker motion. Representative of such systems are those disclosed in U.S. Pat. Nos. 5,640,490, 5,896,450, and 4,499,578. Unfortunately, a speaker might deliberately vary her voice volume, a speaking technique that is frustrated by systems that establish amplifier gain based only on received audio signals. The present invention understands that it would be desirable to more precisely adjust audio system gain based on actual speaker movement relative to a microphone or microphones. The present invention also recognizes that conventional AGC may amplify background noise when the speaker is silent.

SUMMARY OF THE INVENTION

The invention is a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the logic disclosed herein. This invention is realized in a critical machine component that causes a digital processing apparatus to undertake the inventive logic herein.

In one aspect, a computer-implemented method is disclosed for generating a speaker gain adjust signal to establish an audio output level. The method includes receiving a person-microphone position signal representative of a position of a person relative to a microphone, and determining a gain adjust signal based on the person-microphone position signal. The method further includes using the gain adjust signal to establish the audio output level.

In a preferred embodiment, the person-microphone position signal is derived from a video system, but it could also be derived from a motion or position or orientation or distance sensing system, a laser system, a global positioning system, or other light receiving system. The gain adjust signal can be determined based on the distance from a person's mouth to a microphone, or an orientation of a person's head relative to the microphone, or both. Alternatively, the gain adjust signals can be determined from a mapping of calibration person-microphone position signals to calibration audio levels. In any case, the gain adjust signals can be determined contemporaneously with the recording of the person, or determined after the recording of the person. A slow response gain adjuster such as a Kalman filter can also be used to stabilize variations in audio levels caused by rapid movement of the person.

In another aspect, a computer is programmed to undertake logic for dynamically establishing a gain of an audio system. The logic includes receiving a video stream representative of a person and a microphone, and deriving person-microphone position signals using the video stream. The logic also includes using the person-microphone position signals to generate audio gain adjust signals for input thereof to the audio system.

In still another aspect, a computer program product includes computer readable code means for receiving light reflection signals representative of light reflected from a person and light reflected from a microphone. Computer readable code means, based on the light reflection signals, determine an orientation signal. Also, computer readable code means generate an audio gain adjust signal based on the orientation signal.

In another aspect, an audio system includes a microphone electrically connected to an audio amplifier having an audio gain. The system also includes a video camera and a processor receiving signals from the video camera and establishing the audio gain in response thereto.

In yet another aspect, an audio system includes a microphone electrically connected to an audio amplifier having an audio gain. The system also includes a source of person-microphone position signals and a processor receiving signals from the video camera and establishing the audio gain in response thereto.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic diagram of the present system;

FIG. 2 is a flow chart showing the overall logic of the present invention;

DETAILED DESCRIPTION OF THE PREFERRED EMBODIMENTS

Figure 3:
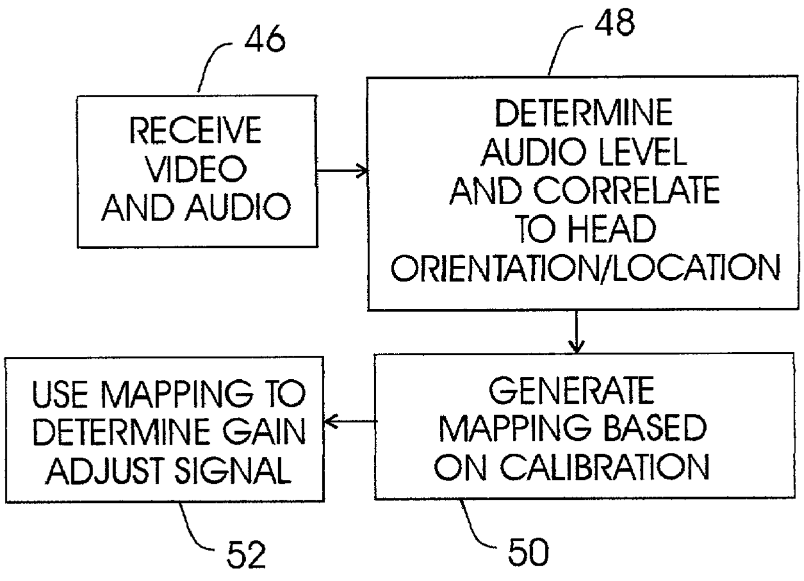
FIG. 3 is a flow chart showing the logic for automatically determining a speaker-to-microphone gain mapping.

Referring initially to FIG. 1, a system is shown, generally designated 10, which includes a digital processing apparatus, such as a computer or processor 12, which has a local or remote gain adjust module 14 that embodies the logic disclosed herein.

In one intended embodiment, the processor 12, may be a personal computer made by International Business Machines Corporation (IBM) of Armonk, N.Y., or it may be any computer, including computers sold under trademarks such as AS400, with accompanying IBM Network Stations. Or, the computer 12 may be a Unix computer, or IBM workstation, or an IBM laptop computer, or a mainframe computer, or any other suitable computing device, such as an ASIC chip.

The module 14 may be executed by a processor as a series of computer-executable instructions. These instructions may reside, for example, in RAM of the processor 12.

Alternatively, the instructions may be contained on a data storage device with a computer readable medium, such as a computer diskette having a data storage medium holding computer program code elements. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ compatible code. As yet another equivalent alternative, the logic can be embedded in an application specific integrated circuit (ASIC) chip or other electronic circuitry. It is to be understood that the system 10 can include peripheral computer equipment known in the art, including output devices such as a video monitor or printer and input devices such as a computer keyboard and mouse. Other output devices can be used, such as other computers, and so on. Likewise, other input devices can be used, e.g., trackballs, keypads, touch screens, and voice recognition devices.

As shown in FIG. 1, the processor 12 receives input via wireless or wired link 16 from a body position and/or orientation detector 18. As disclosed further below, in response to the input from the detector 18 either real-time or offline, the processor 12 accesses the module 14 to generate at least one gain adjust signal, which is sent to an electronics circuit 20 including one or more gain adjust components via a wired or wireless link 22, such that the circuit 20 can establish the gain of one or more audio amplifiers 24 and, hence, the decibel level output by one or more audible speakers 26 that are connected to the amplifier or amplifiers 24. When audio is simply to be recorded and then adjusted later on according to the logic herein, the amplifier 24 and speakers 26 can be omitted. The circuit 20 receives input from one or more microphones 28 via a wireless or wired path 30, it being understood that the microphone 28 can be worn by a person 32, held by the person 32, or positioned adjacent the person 32, such as on a stage, podium, table, etc. While the disclosure below assumes that the gain of amplifier is adjusted, it is to be understood that the circuit 20 can be an analog or digital amplifier or it can be an attenuator. Moreover, it is to be understood that the present invention applies to varying the gains of each frequency (or frequency band) of audio separately from each other.

Moreover, while only a single microphone 28 with amplifier 24 is shown for clarity of disclosure, the present principles can be used to adjust the gains of multiple amplifiers in multiple microphone environments. Some of the microphones might have different acoustic responses in different directions, they may be placed in different locations on the stage, etc. In such a case, the gain control for each channel could be either independently determined in accordance with the below disclosure, or a combination of the channels can be used to determine the best policy for audio gain control for each channel or combination of channels. A single microphone having a "best" signal or "best" direction can be selected.

In one preferred embodiment, the body position/orientation detector 18 is a video camera system, either analog or digital. It can also be a motion detecting system or a laser system or a face-detecting system based on infrared eye detection and tracking, as disclosed in U.S. patent application Ser. No. 09/238,979, incorporated herein by reference. Face and lip tracking can be employed to determine when a specific speaker is actually speaking, if desired, such that the audio signal of another person is not amplified, but only that of the specific speaker. For purposes of disclosure, it will be assumed that the detector 18 is a video system, it being understood that the principles of the present invention apply to any system that essentially receives light reflected from the person 32 and microphone 28 for purposes of deriving a person-microphone position signal which is determined contemporaneously with the person 32 speaking or determined afterward from recorded audio and video data. The entire system 10, including the detector 18, can be implemented in one microphone housing. In such an integrated system, the audio signal from the microphone is balanced, according to the logic below, for head motion effects.

FIG. 2 shows the overall logic of the present invention as might be embodied in software. Commencing at block 34, the video stream is received from the detector 18. The stream if compressed, is decompressed and is then decoded at block 36. Then, at block 38 a person-microphone position signal is derived from the stream. By "person-microphone position signal" is meant a signal that represents the distance between the person 32 (e.g., the mouth of the person 32) and the microphone 28, or that represents the angle between the head of the person 32 and microphone 28, or that represents the head location relative to the direction of sensitivity of the microphone, or a combination of one or more of these factors. Techniques are known for finding distances and angles between objects in a video stream, such as but not limited to the technique described in Jebara et al., "Parameterized Structure from Motion for 3D Adaptive Feedback Tracking of Faces", *Proc. of Computer Vision and Pattern Recognition.* 1997 for face and head tracking, incorporated herein by reference. These techniques can be implemented by the processor 12 to derive a person-microphone position signal based on a video stream from a video-based detector 18.

In one embodiment, the person-microphone position signal can depend on the sine of the angle between the person 32 and the microphone 28, relative to the straight ahead position of the head of the person 32, as derived from a video signal. For disclosure purposes, when a person is directly facing the microphone 28, the angle between the person and microphone is zero; when a person is facing broadside to the microphone, the angle is 90°.

At block 40, a gain adjust signal can be determined based on the person-microphone position signal. For instance, in one non-limiting embodiment, the gain adjust signal is determined as being one plus the sine of the angle between the head of the person and the microphone. In another embodiment, the gain adjust signal is determined as an inverse function of the square of the distance from the head of the person 32 to the microphone 28. At block 42, dynamic adjustment of the audio gain (that is, adjustment of the gain of an audio stream based on a contemporaneous video of a person who generated the stream, accomplished either real-time or sometime after the event from recorded audio and video) is achieved by multiplying values of a digitized audio stream by the gain adjust signals for the periods during which the audio was generated. In one embodiment, the gain adjust signal can be determined and recorded real-time and then later used to adjust audio at a later time, e.g., at playback time. Or, the gain adjust signal can be determined off-line from a video of a speaker and then applied to played-back audio.

FIG. 3 shows that in another embodiment, commencing at block 46, audio and accompanying video are received. At block 48, calibration head orientations are recorded along with contemporaneous calibration audio levels. A mapping is then generated at block 50 based on the calibration signals. For instance, if a baseline calibration level is defined by a zero degree head orientation relative to the microphone, and a 10% sound level reduction occurs when the head is turned 30° away from the microphone, then the mapping would correlate a 30° head orientation to a gain adjust signal that would increase gain by 10%. By correlating various person-to-microphone orientations (including distances) to actually received sound levels, an entire mapping can be generated and subsequently used at block 52 to determine gain adjust signals.

Figure 4:
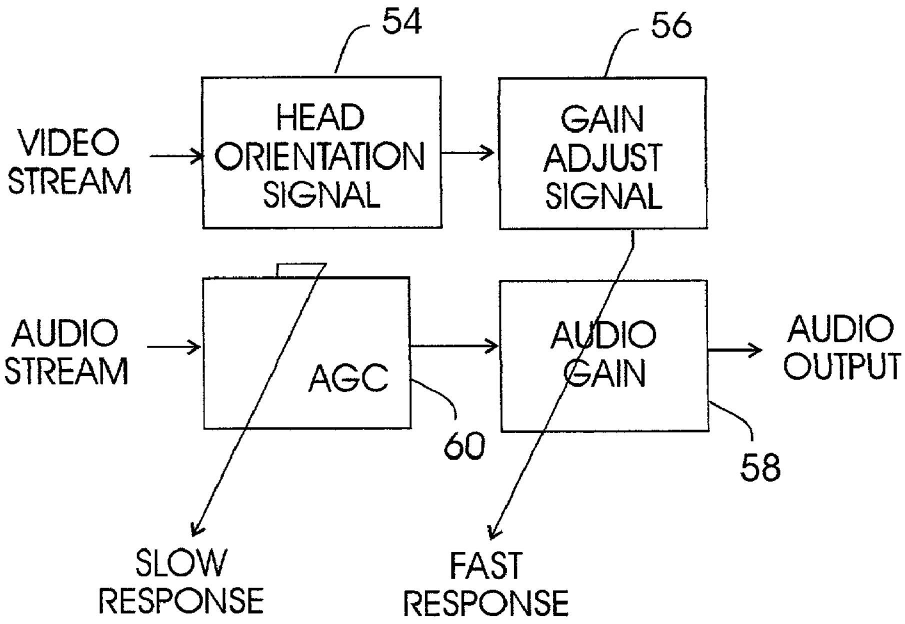
FIG. 4 is a block diagram of a system that generates a fast gain adjust signal based on head orientation and a slow gain signal based on the audio stream.

The video-based gain adjust signals can be thought of as "fast" adjust signals, since they can change rapidly, as a person moves. To smooth out variations in audio level output by the speaker 26, it might be desirable to provide a slow gain adjust signal as well. FIG. 4 shows such a system, wherein a person-microphone position signal is derived at state 54 from an input video stream and a fast gain adjust signal generated at state 56, for adjusting the gain of an amplifier at state 58. Additionally, at state 60, a slow gain adjust mechanism such as but not limited to an automatic gain adjust (AGC) such as a Kalman filter can be used to stabilize the rate of change of the input audio signal. The slow adjust and fast adjust gain signals are combined to smooth out potentially rapid changes in audio output levels. Moreover, the slow gain adjust component can adjust to slow-occurring changes that might occur, for example, as a battery voltage associated with the system 10 decreases over time. Also, the audio gain signal can be smoothed so that a rapid head motion will not cause an unpleasant change to the audio gain. This can be done as part of the gain calculation, in which case the gain calculation is based not only on current head position but also on history of gain signal and/or history of head position.

While the particular SYSTEM AND METHOD FOR MICROPHONE GAIN ADJUST BASED ON SPEAKER ORIENTATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims. For example, when multiple speakers are using one or more microphones on a stage, the present system can measure multiple head-microphone positions, each related to a person, and an identification method such as the above-disclosed lip tracking can identify who is the current speaker, with the audio gain being adjusted according to that speaker's head position. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A digital processor programmed to undertake logic for dynamically establishing a gain of an audio system, the logic being stored on a computer readable medium and executable by the digital processor to implement a method including:

receiving a video stream representative of at least one person and at least one microphone;

deriving person-microphone position signals using the video stream;

using at least some of the person-microphone position signals, generating audio gain adjust signals for input thereof to the audio system;

recording at least one calibration person-microohone position signal;

recording at least one calibration audio level contemporaneously with the calibratiotperson-microphone position signal;

using the calibration signal and calibration level, generating at least one mapping correlating head orientations to respective gain adjust percentages; and at least in part using the gain adjust percentages, establishing an audio gain of the audio system.

2. The digital processor of claim 1, wherein the logic further includes determining an audio gain adjust signal based at least partially on: a distance from a person's mouth to a microphone.

3. The digital processor of claim 1, wherein the logic further comprises using the mapping to generate at least one gain adjust signal based on at least one person-microphone position signal.

4. The digital processor of claim 1, wherein the gain adjust signal is determined contemporaneously with recording the person.

5. The digital processor of claim 1, wherein the person is recorded, then the gain adjust signal is determined after the recording of the person.

* * * * *